(12) United States Patent
Ghoshal et al.

(10) Patent No.: US 9,280,483 B1
(45) Date of Patent: Mar. 8, 2016

(54) REBRANDING A PORTABLE ELECTRONIC DEVICE WHILE MAINTAINING USER DATA

(71) Applicant: Sprint Communications Company L.P., Overland Park, KS (US)

(72) Inventors: Jagannath Ghoshal, Overland Park, KS (US); John D. Sumler, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 275 days.

(21) Appl. No.: 13/899,567

(22) Filed: May 22, 2013

(51) Int. Cl.
| | |
|---|---|
| *H04M 3/00* | (2006.01) |
| *G06F 12/08* | (2006.01) |
| *G06F 3/06* | (2006.01) |
| *H04L 12/58* | (2006.01) |
| H04W 8/24 | (2009.01) |
| H04W 4/00 | (2009.01) |
| H04W 8/18 | (2009.01) |
| H04M 1/725 | (2006.01) |
| H04B 1/3816 | (2015.01) |

(52) U.S. Cl.
CPC .......... *G06F 12/0891* (2013.01); *G06F 3/0671* (2013.01); *H04L 51/046* (2013.01); *H04B 1/3816* (2013.01); *H04M 1/72525* (2013.01); *H04M 3/00* (2013.01); *H04M 2215/32* (2013.01); *H04M 2250/14* (2013.01); *H04W 4/00* (2013.01); *H04W 8/183* (2013.01); *H04W 8/245* (2013.01)

(58) Field of Classification Search
USPC .............. 455/219, 432.1, 558, 405, 407, 408; 709/206
See application file for complete search history.

(56) References Cited

U.S. PATENT DOCUMENTS

| | | | |
|---|---|---|---|
| 6,131,024 A | * | 10/2000 | Boltz ............................. 455/405 |
| 6,445,914 B1 | | 9/2002 | Findikli et al. |
| 6,753,887 B2 | | 6/2004 | Carolan et al. |
| 7,165,191 B1 | | 1/2007 | Vakrat |
| 7,260,382 B1 | | 8/2007 | Lamb et al. |
| 7,266,371 B1 | | 9/2007 | Amin et al. |
| 7,493,111 B2 | | 2/2009 | Knowles |
| 7,817,988 B2 | | 10/2010 | Kruis et al. |

(Continued)

FOREIGN PATENT DOCUMENTS

| | | |
|---|---|---|
| GB | 2292047 A | 2/1996 |
| KR | 2006039974 A | 5/2006 |

(Continued)

OTHER PUBLICATIONS

First Action Interview Pre-Interview Communication dated Sep. 22, 2014, U.S. Appl. No. 13/468,028, filed May 9, 2013.

(Continued)

*Primary Examiner* — Kyung H Shin

(57) ABSTRACT

A portable electronic device may be rebranded, this rebranding may cause a plurality of data files in a user memory partition on the portable electronic device to be deleted when the device is returned to factory settings or otherwise wiped during the rebranding. Rebranding may be desirable in order for the user to receive better and/or more cost-effective services from a telecommunications service provider. Therefore, a user may want to rebrand their device without losing the data in the user memory partition. The user may specify or configure the device to copy or move the plurality of data to a carrier memory partition or a system memory partition on the device, or to a remote server, or to a removable memory such as an SD card.

20 Claims, 10 Drawing Sheets

(56) References Cited

U.S. PATENT DOCUMENTS

| | | |
|---|---|---|
| 7,904,895 B1 | 3/2011 | Cassapakis et al. |
| 7,991,988 B2 | 8/2011 | Chen |
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 * | 8/2012 | Zhu .................. 455/558 |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 * | 5/2013 | Fleischman et al. ....... 455/432.1 |
| 8,571,536 B2 | 10/2013 | Urbanek |
| 8,612,967 B1 | 12/2013 | Delker |
| 8,626,165 B1 | 1/2014 | Narasimhan et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,291 B1 | 12/2014 | Spanel et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 2002/0091931 A1 | 7/2002 | Quick, Jr. et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0079855 A1 | 4/2005 | Jethi et al. |
| 2005/0085222 A1 | 4/2005 | Przybilski et al. |
| 2005/0119001 A1 | 6/2005 | Watanabe |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0061840 A1 * | 3/2009 | Fleischman et al. .......... 455/419 |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |

(56) References Cited

U.S. PATENT DOCUMENTS

| | | | |
|---|---|---|---|
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065578 A1 | 3/2013 | Raleigh et al. |
| 2013/0072168 A1 | 3/2013 | Colucciello et al. |
| 2013/0085914 A1 | 4/2013 | McPherson et al. |
| 2013/0111461 A1 | 5/2013 | Zubas et al. |
| 2013/0137417 A1 | 5/2013 | Urbanek |
| 2013/0196647 A1 | 8/2013 | Raleigh et al. |
| 2013/0198567 A1 | 8/2013 | Ahmed Istiak et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani Rita et al. |
| 2013/0311836 A1 | 11/2013 | Hurst Cameron et al. |
| 2014/0045483 A1 | 2/2014 | Whidden |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad Satish et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0017962 A1 | 1/2015 | Howard et al. |
| 2015/0065105 A1 | 3/2015 | Masterson et al. |
| 2015/0111564 A1 | 4/2015 | Urbanek |
| 2015/0111565 A1 | 4/2015 | Urbanek |

FOREIGN PATENT DOCUMENTS

| | | | |
|---|---|---|---|
| WO | 2012078753 A1 | 6/2012 |
| WO | 2013169983 A1 | 11/2013 |
| WO | 2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |

OTHER PUBLICATIONS

Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication From a Related Counterpart Application, International Search Report and Written Opinion dated Jan. 24, 2014, International Application No. PCT/US13/68981 filed on Nov. 7, 2013.
Spanel, Robert L., et al., Patent Application entitled "Dynamic Remotely Managed Sim Profile" U.S. Appl. No. 13/744,847, filed Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16 , 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Foreign Communication from a Related Counterpart—International Search Report and Written Opinion, dated Jun. 3, 2014, PCT/US14/16650, filed on Feb. 16, 2014.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed Sim Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.

(56) References Cited

OTHER PUBLICATIONS

Blinn, Benjamin P., et al. "System and Method of Efficient Mobile Device Network Brand Customization," filed Sep. 2, 2014, U.S. Appl. No. 14/475,399.
Foreign Communication from a Related Counterpart—International Search Report and Written Opinion, dated Nov. 14, 2013, PCT/US13/55023, filed on Aug. 15, 2013.
Mauer, Brian D., et al., "Automatic Branding of Generic Applications", filed Jan. 10, 2013, U.S. Appl. No. 14/152,627.
Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586 filed on Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
Foreign Communication from a Related Counterpart—International Search Report and Written Opinion, PCT/US2011/063736.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Urbanek, Robert E., "System and Method of Wireless Communication", filed Dec. 7, 2010, U.S. Appl. No. 12/962,620.
Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011 U.S. Appl. No. 13/149,505.
Burcham, Robert H., et al., "Self-Identification of Brand and Branded Firmware Installation in a Generic Electronic Device", filed May 9, 2012 U.S. Appl. No. 13/468,028.
Mauer, Brian D., et al., "Automatic Branding of Generic Applications", filed Dec. 23, 2011 U.S. Appl. No. 13/335,941.
Urbanek, Robert E, "Generic Mobile Devices Customization Framework", filed Sep. 18, 2012, U.S. Appl. No. 13/622,234.
Annan, Brandon C., et al.,"System and Method of Branding and Labeling a Mobile Device", filed Mar. 15, 2013, U.S. Appl. No. 13/844,104.
Annan, Brandon C., et al.,"System and Method of Storing Service Brand Packages on a Mobile Device", filed Feb. 8, 2013, U.S. Appl. No. 13/763,428.
Annan, Brandon C., et al.,"System and Method of Provisioning and Reprovisioning a Mobile Device Based on Self-locating", filed Feb. 8, 2013, U.S. Appl. No. 13/763,434.
Annan, Brandon C., et al.,"Electronic Fixed Brand Labeling", filed Feb. 8, 2013, U.S. Appl. No. 13/763,443.
Ghoshal, Jagannath, et al.,"System and Method for Retrofitting a Branding Framework into a Mobile Communication Device", filed May 21, 2013, U.S. Appl. No. 13/899,566.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
First Action Interview Pre-Interview Communication dated Apr. 23, 2014, U.S. Appl. No. 13/622,234, filed Sep. 18, 2012.
First Action Interview Pre-Interview Communication dated Apr. 3, 2014, U.S. Appl. No. 13/763,434, filed Feb. 8, 2013.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Notice of Allowance dated Jun. 21, 2013, U.S. Appl. No. 13/752,386, filed Jan. 28, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
Delker, Jason R., "Loading Branded Media Outside System Partition", filed Oct. 30, 2013 U.S. Appl. No. 14/066,947.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.

(56) References Cited

OTHER PUBLICATIONS

Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle at Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013 .
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed on Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
Urbanek, Robert E., "Generic Mobile Devices Customization Framework," filed Oct. 7, 2015, U.S. Appl. No. 14/877,215.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.

\* cited by examiner

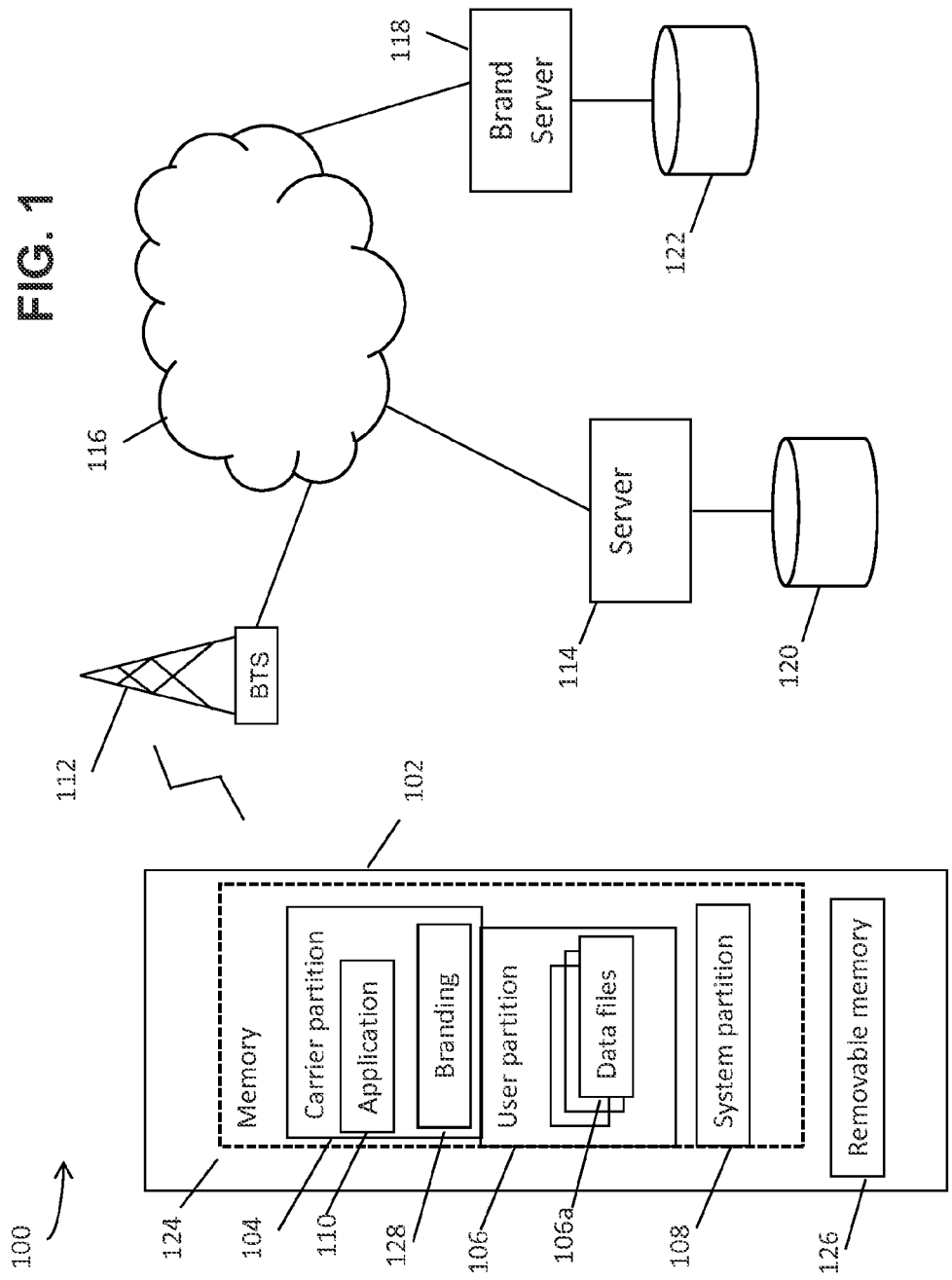

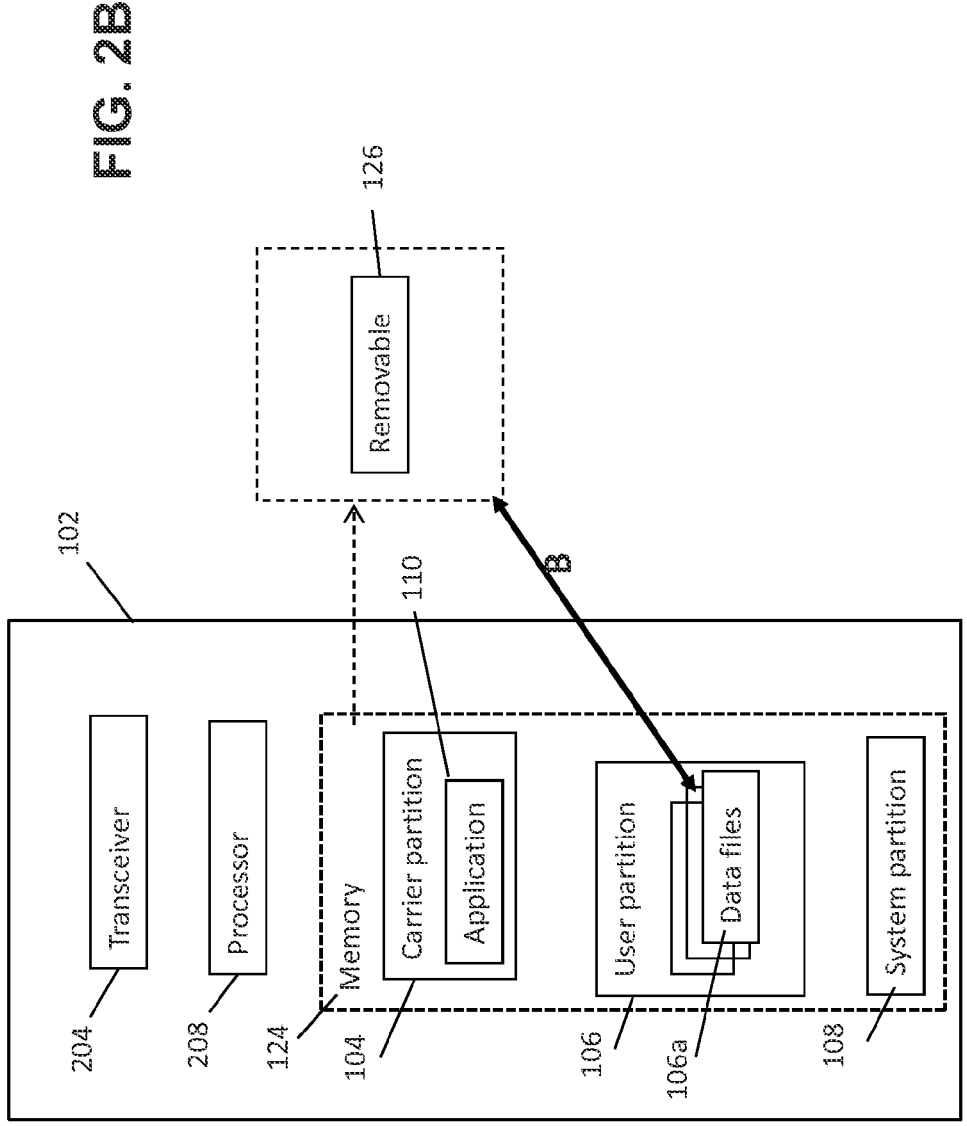

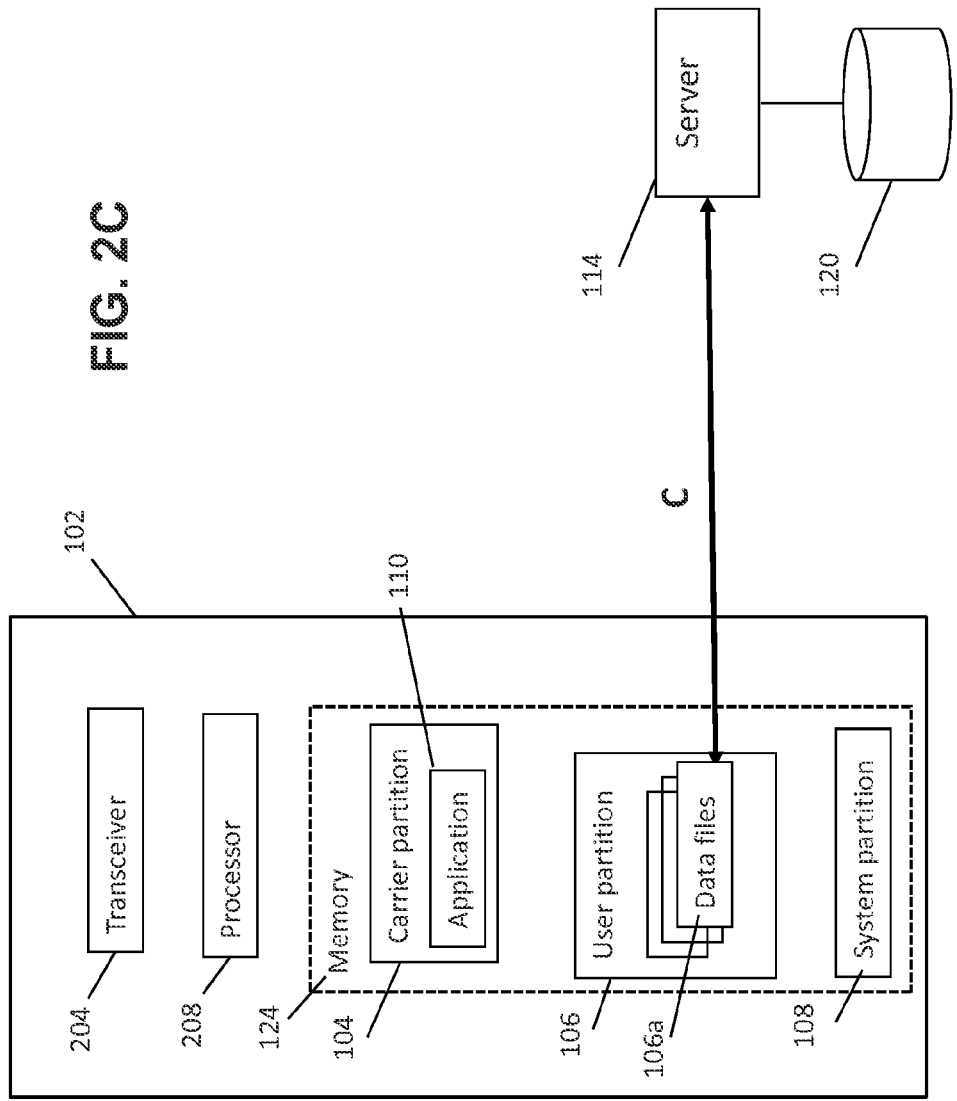

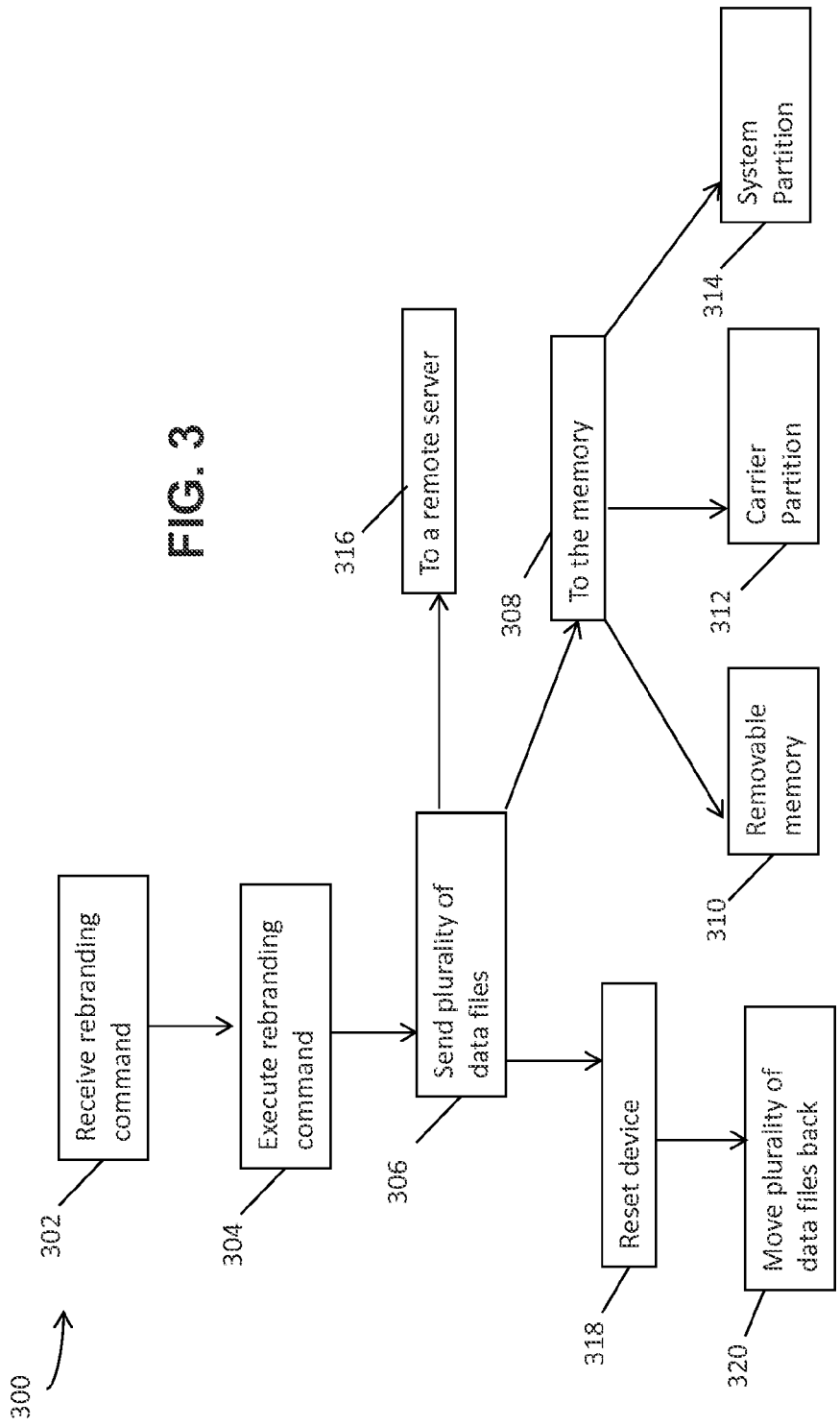

REBRANDING A PORTABLE ELECTRONIC DEVICE WHILE MAINTAINING USER DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic communication devices may be associated with a brand offered by a telecommunications service provider. This association may be based on a pre-paid subscription plan, a contract subscription plan, or a pay-as-you-go plan, and a portable electronic communication device may be associated with multiple brands offered by a telecommunications service provider or with multiple telecommunications service providers during its lifetime. A portable electronic device may have parts of the user experience that are associated with the brand. For example, the customer care center mapped to the device, the store presented on the device where applications or other add-ons may be purchased, as well as animations seen on power-on/power-off and may also include other settings configurable by the user.

SUMMARY

In an embodiment, a system for rebranding a portable electronic device comprising:
a portable electronic device associated with a service brand comprising: a processor; a removable memory; and a memory comprising: a system memory partition associated with a manufacturer of the portable electronic device, a user memory partition comprising a plurality of data, and a carrier memory partition associated with a telecommunications service provider, wherein the carrier memory partition comprises an application that, when executed by the processor, receives a file comprising a rebranding command. The embodiment further comprising: wherein executing the rebranding command resets at least one the user memory partition, wherein, prior to the at least part of the memory being reset, at least some data of the plurality of data are relocated to at least one storage location; and wherein, subsequent to the application executing the rebranding command, the at least some data is transferred back to the user partition from the at least one storage location.

In an embodiment, a method of rebranding a portable electronic device comprising: receiving, by an application stored in a carrier memory partition in a memory of a portable electronic device, a rebranding command; executing, by the application, the rebranding command, wherein executing the rebranding command comprises: sending, by the application, a plurality of data from a user memory partition in the memory of the portable electronic device to a storage location other than the user memory partition, and resetting, subsequent to sending the plurality of data to the storage location, factory default settings to at least the user memory partition; retrieving, by the application, subsequent to executing the rebranding command, the plurality of data from the storage location; and sending, by the application, the plurality of data back to the user memory partition.

In an alternate embodiment, a method of rebranding a portable electronic device comprising: receiving, by an application stored in a carrier memory partition of a portable electronic device, a rebranding command, wherein the rebranding command is received in response to a selection of a new service brand from a notification sent to the portable electronic device, and wherein the notification is sent to the portable electronic device based on at least one of a history of service of the portable electronic device or a manual request; and executing, by the application, the rebranding command, wherein executing the rebranding command comprises: resetting at least some of the memory of the portable electronic device; sending, by the application, prior to resetting the at least some of the memory, a plurality of data from a user memory partition on the portable electronic device to at least one storage location. The embodiment further comprising retrieving, by the application, subsequent to executing the rebranding command, the plurality of data from the at least one storage location; and sending, by the application, the plurality of data back to the user memory partition.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 is an illustration of a system capable of executing embodiments of the disclosure.

FIGS. 2A-2D illustrate systems capable of executing methods of the present disclosure.

FIG. 3 is a flow chart of a method of rebranding a portable electronic device while maintaining user data.

DETAILED DESCRIPTION

Figure 2A:
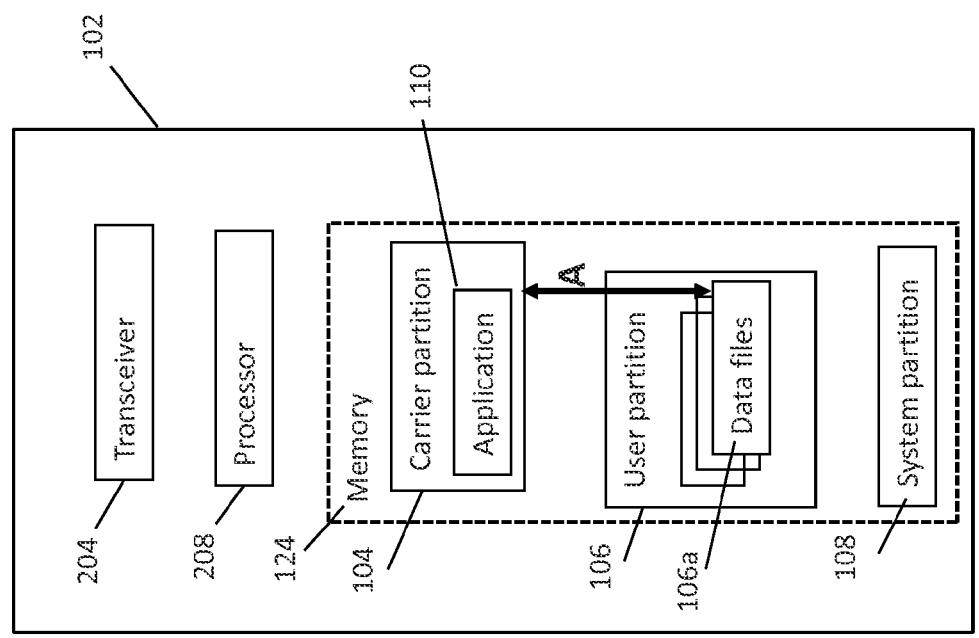
Figure 2D:
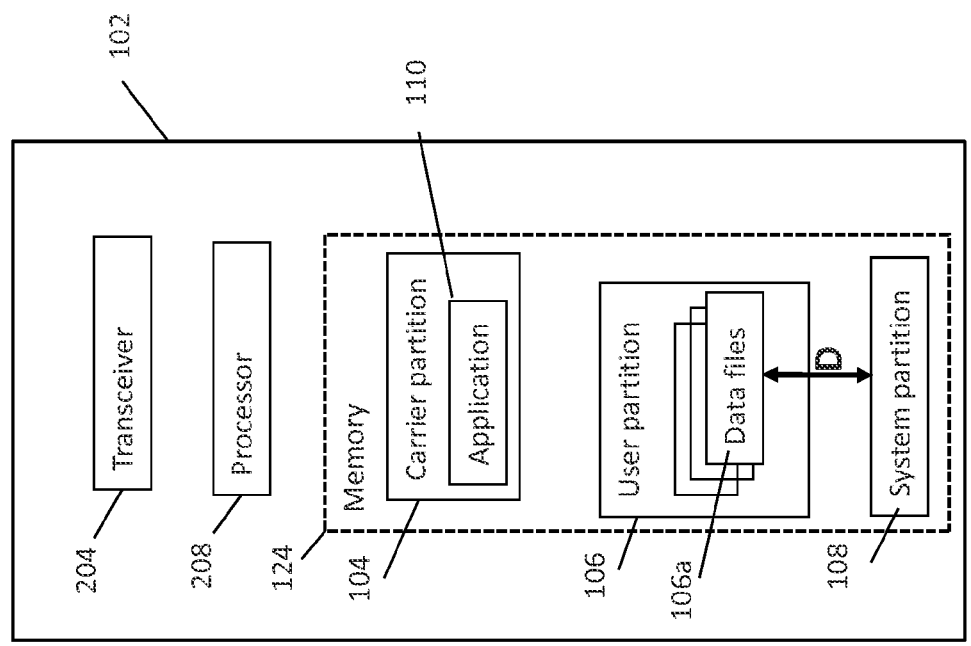

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The user of a portable electronic device may subscribe to a voice and/or data service plan offered by a telecommunications service provider. During the lifetime of the device, it may be associated with a plurality of different telecommunications service providers and/or with a plurality of different brands associated with a single telecommunications service provider. A telecommunications service provider may offer a plurality of voice and/or data subscriptions for varying use patterns and price points under one or more brands. This subscription, which may also be referred to as a subscription plan or a service plan, may be pre-paid, post-paid, pay as you go, have periodic billing cycles, and may or may not involve a contract. A provider may also offer the opportunity for users to switch plans including switching plans between brands. The plurality of service plans may comprise different combinations of use for voice and/or data services and may also comprise options for international and/or roaming use as well as push-to-talk. If a device switches brands, which may occur because of a selection of a new service plan offered by a brand other than the brand that offers the current service plan, the device may be rebranded.

In some embodiments, rebranding comprises deleting some or all data in the memory of the portable electronic device. The memory of the portable electronic device may comprise a system memory partition ("system partition"), a carrier memory partition ("carrier partition"), and a user memory partition ("user partition"). In other embodiments, rebranding may comprise resetting the phone and resetting may cause the contents including data and applications in the user memory partition to be erased. The user memory partition is the part of the memory of the portable electronic device that the user can write to, as opposed to the system memory partition or the carrier memory partition discussed below which the user may not be able to write to or otherwise actively or directly access. The system memory partition may comprise a plurality of rules for how software, hardware, and firmware associated with the system's functioning operate. The system memory partition may not be directly accessible by the user, and in some embodiments the device manufacturer may limit access so that only the manufacturer can write to or view information in this partition. The carrier memory partition is associated with the telecommunications service provider and may contain a plurality of rules associated with providing voice and/or data services to the device. The carrier memory partition may not be directly accessible to the user and the access to this partition may be set by the provider to limit what parties and entities can read and write to the carrier partition. Rebranding may also comprise adding features and/or options and/or settings to the phone as well as new logos representing the new brand. These new logos may be used, for example, on startup or shutdown of the device.

A user may want to preserve their data, settings, applications, etc., subsequent to rebranding and may do so using the systems and methods disclosed herein because even if a particular setting or application cannot be used with the new brand, that information may still reside on the device in the user memory partition and may be accessed, for example, by an IT professional or other customer care representative. It is appreciated that the settings and configuration options available to a user may be associated with and available under a particular telecommunications service brand and that this association and availability may differ between brands. In an embodiment, the device may be reset during rebranding. This reset may involve a return to factory settings, or otherwise include a process whereby data in the memory, for example, data in the carrier, system, and user partitions, of the device may be altered or removed.

A user may want to preserve the plurality of data files in the user memory partition when the portable electronic device is rebranded so that the plurality of data files are not lost during rebranding. In order to preserve the data files, the files may be copied and the copy moved to a storage location, or the data files may be relocated without first making a copy. Since the plurality of data files are moved to a storage location prior to resetting, the plurality of data files are not deleted from the storage location and therefore the settings and preferences established by the user are maintained in the storage location during rebranding so that the user does not have to reset those items or download applications again and attempt to recover the related data and/or settings. Once a device has been rebranded, the data that was relocated for preservation is automatically loaded back by copying or moving to the user memory partition. In the event that at least some data files of the plurality of data files are moved to a location that is full or that would exceed capacity by storing the files, the files may be automatically routed to a different storage location. In an embodiment, a notification may be sent to the portable electronic device to indicate the change in storage location or requests approval to store the files in a location that was not previously specified. It is understood that this notification is separate and distinct from the notification that may be sent to the device to alert or suggest a new brand. Alternatively, the device may be configured to have at least a predetermined primary and secondary storage location. Portions of the plurality of data files may be stored in multiple locations, or may be stored in multiple locations simultaneously as a backup. In some embodiments, the predetermined storage location, locations, or hierarchy of locations, may be established at the original equipment manufacturer OEM or by the telecommunications service provider.

All of the data files may be relocated by moving or copying to one or more storage locations including the system or carrier memory partitions on the device, removable media, or a remote server. It is appreciated that the storage location specified is not one that will be erased, overwritten, or otherwise modified during rebranding. If a user's data is not relocated to a storage location that will not be affected during the resetting that occurs during rebranding, the data may be lost or otherwise compromised. The user may then have to manually re-load applications, add-ons, reconfigure settings for the device as well as for applications and/or add-ons, and this may be a time-consuming process. This process may be so time consuming that the user is less likely to rebrand the device because they do not want the hassle of manually reloading data or the risk that some of their data may not be recoverable. Therefore, the ability to rebrand a device without losing user data may actually encourage users to associate with the brand that best serves their device, thereby retaining customers for the telecommunications provider and improving the overall customer experience.

If a new brand is selected, the portable electronic device may be rebranded. The rebranding process may comprise loading at least one new startup logo for the device, different options for configurations of hardware, software, and other user-defined settings on or associated with the device in addition to associating the new service plan with the device. For example, there may be a new power-on/power-off logo or logos, a different application store may be available, or the recommendations in the application store may be tailored to the brand, different applications may be able to execute on the rebranded device, and different configurable settings for device appearance, sounds, and other functionality may also be different with a new brand.

In an embodiment, completing rebranding may entail resetting the mobile communication device. Resetting may cause the user memory partition to be erased, including erasing user data and/or applications. However, a user may not want to potentially lose this data and may instead want to protect the data during the rebranding process. The user may want to protect this information because, if it is wiped during rebranding, the user may have to re-download and re-set-up each application as well as re-configuring other settings which may be time-consuming and may cause the user not to rebrand in the first place. In some embodiments, data lost during rebranding may not be able to be recovered. From the telecommunications service provider's perspective, rebranding may be desirable in order to retain and develop its customer base by ensuring its customers are getting the most service(s) for their money, and may also be desirable because rebranding may allow maximization of resources from the provider's perspective both from cost and human resources perspectives.

FIG. 1 is an illustration of a system 100 for executing embodiments of the disclosure. A system 100 comprises a portable electronic device 102. The portable electronic device 102 comprises a memory 124 that comprises a carrier memory partition 104, a user memory partition 106 and a system memory partition 108. The carrier memory partition 104 may comprise an application 110 and may contain branding information 128 and other information originating from the provider. The carrier memory partition 104 may operate based on a set of rules that may originate from the telecommunications service provider and may be distinct from the root or system memory partition 108 and the user memory partition 106. Rebranding may also comprise associating a different application or add-on store with the device as well as access to a different customer care group. The plurality of user data files in the user memory partition may comprise a plurality of pieces of information including applications and related settings, as well as add-ons, hardware configurations, connectivity, software configurations, and at least one user profile which may comprise at least some pieces of information of the plurality of pieces of information. The user profile may be configured by the user in whole or in part, and may also comprise the icons to be displayed in a particular view of the graphical user interface. The options available on a device for the user to configure the device may depend on the brand associated with the service plan associated with the device. In an embodiment, the carrier memory partition 104 or the system memory partition 108 may comprise a tool that parses the data related to configuration settings. This may be because, in some instances, storing the data from the user memory partition 106 may mean that relevant configuration information and metadata are stored that are associated with an application, but that the application itself may not be stored. In this embodiment, the tool may, based on a set of rules, parse the data related to configuration settings when there are different configuration options for one brand as compared to another. The parsed data may then be copied, for example, by the application 110, to at least one storage location. In that case, the configuration setting of the initial brand may be restored after re-branding, or, if a particular configurable option or set of options are not available with the new brand or do not directly translate, the tool may remap those configurations to alternate settings or store the configuration settings without implementing them. The metadata and user specific configuration data can be used to retrieve and install the standard application data from its original source such as an applications store or an alternate general source. The user specific configuration data is retrieved and used to place the standard application in the condition that it was in when it was turned off and migrated. In an embodiment, the configuration settings may also be deleted by the tool.

The carrier memory partition 104 may be accessible by the provider. The user of the device, as well as other parties, may not be able to read and/or write to that carrier memory partition 104. The application 110 may be an application used for rebranding the device 102 and may be referred to as a rebranding application 110. The user memory partition 106 may comprise a plurality of data for applications, user profiles, hardware configurations, software configurations, and other settings that the user of the portable electronic device may have established or installed. The system memory partition 108 is a part of the memory 124 that stores information that a user may not be able to write to or otherwise modify and may operate based on a set of rules from the original equipment manufacturer (OEM) or the telecommunication services provider, or both.

In an embodiment, the device 102 comprises a removable memory 126 such as a secure digital (SD) card, SIM card, or other removable storage device. The portable electronic device 102 may communicate wirelessly with a network 116 by way of a base transceiver station 112. The network 116 may comprise a plurality of servers including servers 114 and 118. In an embodiment, server 118 may be a brand or branding server, comprising at least one data store 122 that stores a plurality of brand information. In an embodiment, voice and data service plan information associated with a plurality of telecommunications service brands may also be stored on the branding server 118, and in an alternate embodiment it may be stored on a remote server such as server 114. The server 114 may be referred to as a remote server and may comprise at least one data store 120. It is appreciated that, in some cases, multiple portable electronic devices of varying types such as tablets, laptops, personal computers, personal digital assistants (PDAs), mobile phone, and smart phones, may be associated with a single plan. In other cases, a single device may be associated with a single plan, or multiple devices may be associated with multiple plans on a single account, for example, a corporate or business account.

The server 114 may be used to store user data during rebranding as discussed in detail below and may store other data related to the telecommunications service provider. In some embodiments, a client ID is associated with the portable electronic device 102, this client ID may cause certain applications and options to be available to and/or presented to the portable electronic device 102 when the device is connected to, for example, a web interface that promotes downloads of applications, music, and other software from a site maintained by the telecommunications service provider or a third party. This client ID may also be described as an operating system ID (OS ID) and may be used to present options and downloads to the portable electronic device 102 where certain options and downloads may or may not be available to the device depending upon the associated client ID. In an embodiment, the rebranding application 110 receives and executes a rebranding command or instruction sent from the branding server 118. This rebranding command may be sent randomly, by request, at predetermined intervals of time and/or usage of the portable electronic device 102, at predetermined intervals based on a service subscription renewal, or in response to a history of use of at least one of voice services or data services on the portable electronic device 102. As a part of executing the rebranding command, a plurality of data files 106a located in the user memory partition 106 may be moved to a storage location where the files will not be over-written or otherwise deleted or altered during the rebranding. The plurality of data files 106a may be moved in full or in part to at least one of a plurality of storage locations comprising the at least one data store 120 on the server 114, the carrier memory partition 104, the system memory partition 108, or the removable memory 126. Rebranding may reset at least the user memory partition 106 of the portable electronic device 102 to the factory settings which may delete any information contained in that location user memory partition 106. Subsequent to rebranding, the plurality of data files 106a may be retrieved by the application 110 from the storage location and returned to the user memory partition 106, thereby preserving the user data across the resetting and rebranding.

FIGS. 2A-2D illustrate systems capable of executing methods of the present disclosure. In the systems shown in FIGS. 2A-2D, the portable electronic device 102 may comprise a wireless transceiver 204, a processor 208, and, as shown in FIG. 1, the memory 124 that may comprise the carrier memory partition 104, the user memory partition 106, and the system memory partition 108. The application 110 which may be referred to as a rebranding application may be stored in the carrier memory partition 104. In an embodiment, the rebranding application 110 may receive an instruction or command to rebrand the portable electronic device 102. This instruction may be received by the rebranding application 110 in response to a user selection on the portable electronic device 102 or from a remote instruction, for example, from the telecommunications service provider. In response to receiving the rebranding command, the rebranding application 110 may send a plurality of data files 106a from the user memory partition 106 to a new storage location. The new storage location may be determined by user preferences on the device or may be selected and/or confirmed by the user if it was previously selected prior to rebranding after the rebranding application receives the rebranding command 110. In process "A" in FIG. 2A, the plurality of data files 106a may be moved to the carrier memory partition 104 which may not be affected by resetting. In an embodiment, the storage location, a plurality of storage locations, or a hierarchy of storage locations, may be coded into the application 110.

Alternatively, as shown in FIG. 2B, the portable electronic device 102 may also comprise a removable memory 126 such as an SD card, SIM card, or other removable medium. In an embodiment in process "B" in FIG. 2B, the plurality of data files may be transferred to this removable memory 126. In another embodiment of the system shown in FIG. 2C, the plurality of data files 106a may be moved in process "C" from the user memory partition 106 to the remote server 114 that comprises at least one data store 120. The remote server 114 may be operated by the telecommunications service provider offering the rebranding or by a third-party. In the embodiment in FIG. 2D, the plurality of data files 106a is transferred in process "D" to the system memory partition 108 which may not be altered during rebranding. In some cases, two or more of the processes A, B, C, and D shown in FIGS. 2A-2D may be used in combination to store the plurality of data files 106a in multiple locations.

In any embodiment as shown by FIGS. 2A-2D, moving the plurality of data files 106a may comprise making a copy and moving the copy or moving the plurality of data files 106a without making a copy. In another embodiment, some of the plurality of data files 106a may be moved to one location and some of the plurality of data files 106a may be moved to a different location. Once the plurality of data files 106a are moved to at least one storage location, the rebranding command is executed by the rebranding application 110. After the rebranding has occurred, the plurality of data files 106a is transferred from the location or locations where it was moved back to the user memory partition 106, as shown by processes A, B, C, and D, in FIGS. 2A-2D.

Since the plurality of data files 106a were moved to a storage location prior to resetting, the plurality of data files 106a are not deleted and therefore the settings and preferences established by the user are maintained so that the user does not have to reset those items or download applications again and attempt to recover the related data and/or settings. In the event that at least some data files of the plurality of data files 106a are moved to a location that is full or that would exceed capacity by storing the files, the files may be automatically routed to a different storage location. In an embodiment, a notification may be sent to the portable electronic device 102 to indicate the change in storage location or requests approval to store the files in a location that was not previously specified. It is understood that this notification is separate and distinct from the notification that may be sent to the portable electronic device 102 to alert or suggest a new brand. In an embodiment, a user may receive a notification by email, multimedia messaging service (MMS), short messaging service (SMS), or other means regarding branding. This notification may be sent, for example, by the telecommunications service provider that supports the device to announce a new service brand, changes to options within a service brand, or to recommend a new or existing service brand to the user. This recommendation may be based upon a history of use of the device or a history of use of a plurality of devices under a brand or service plan. The history of use may comprise the use of voice services and data services as well as application use, downloads, and the timing (time of day, day of the week) and length of the use of various voice and data services. In some embodiments, the history of use may comprise a history of the location of use, for example, domestic, international, domestic roaming, or international roaming, and the type of use in these locations. It is appreciated that the term "roaming" as used herein refers to when a device receives data and/or voice services from a provider other than the provider with which the device has a service plan.

The history of use may be evaluated by an application or system of the telecommunications service provider, or by a third party, in order to determine if it is appropriate to send a notification. In some embodiments, the notification may be sent not only based upon the history of use of a device or device on a plan or under a particular brand and registered to the same entity or person, but also based upon a history of previous accept/decline rates for similar offers to other devices with similar user histories. The notification may comprise a link to where the brand can be changed and/or where a comparison of brand services may be viewed. Alternatively, the notification may comprise a phone number or other contact information that the user may employ to switch phone brands. In another embodiment, a user may receive a suggestion for, or information related to, a new brand or a change in a brand's services and options from a customer care representative during an initial customer care call or visit, follow-up call, or marketing call. In an embodiment where multiple devices are on one plan, for example a group or corporate service plan, the history of use may be taken from some or all devices on the service plan and the notification may be sent to an email or primary device associated with the group or corporate plan.

Alternatively, the portable electronic device 102 may be configured to have at least a predetermined primary and secondary storage location. Portions of the plurality of data files 106a may be stored in multiple locations, or may be stored in multiple locations simultaneously as a backup. In some embodiments, the predetermined storage location, locations, or hierarchy of locations, may be established at the OEM or by the telecommunications service provider.

FIG. 3 is a flow chart of a method of rebranding a portable electronic device while maintaining user data. In method 300 at block 302, an application such as the rebranding application 110 in FIGS. 1 and 2 receives a rebranding command from a branding server. In an embodiment, the rebranding command may be received by the rebranding application 110 on the portable electronic device 102 in response to a selection made by the user of the portable electronic device 102. This selection may be made from a notification displayed on the portable electronic device 102 or by interaction with a customer care representative. At block 304, the rebranding command is executed. As part of this execution at block 306 plurality of data files 106a in the user memory partition 106 on the portable electronic device 102 are sent to another location so that the rebranding can proceed which may comprise reformatting, erasing, wiping, or otherwise altering and/or deleting the files in the user memory partition 106. Some or all of the plurality of data files 106a may be moved to a single location or to multiple locations as demonstrated at blocks 308 and 316. At block 306, at least some data files of the plurality of data files are moved to a remote server. This remote server may be maintained by the telecommunications service provider or by a third party. In an embodiment, the remote server is not the same as the branding server that stores and sends branding information to the portable electronic device 102. It is appreciated that moving the files may comprise copying the data files and moving the copied files, or moving the files without creating a copy, or a combination of both. Alternatively or in addition to the moving of files at block 316 to the remote server, at least some of the plurality of data files 106a may be moved to the memory at block 308 which may involve a move to a removable memory at block 310, to the carrier memory partition 104 at block 312, or to the system memory partition 108 at block 314.

At block 318, after at least some of the plurality of data files 106a have been removed from the user memory partition 106, the rebranding application 110 executes the rebranding command and the portable electronic device 102 is rebranded, for example, by resetting the portable electronic device 102 as discussed above. In an embodiment, rebranding comprises restoring the user memory partition 106 to factory settings. Different options may be configurable depending upon what brand is associated with the portable electronic device 102, and when the user memory partition 106 is reset to factory settings, some or all of the options available with the previous brand may be available with the current brand. At block 320, subsequent to rebranding, the rebranding application 110 moves the plurality of data 106a files back from the at least one storage location to the user partition 106. In an embodiment, if some of the data files of the plurality of data files 106a cannot be read and/or written after the portable electronic device 102 is reset and rebranded, for example, because of the configuration of the portable electronic device 102 associated with the new brand, that information may still be stored in the memory of the portable electronic device 102, for example, in the user memory partition 106 or elsewhere and it may be accessed by at least the telecommunications service provider in the event retrieval is desired.

Figure 4:
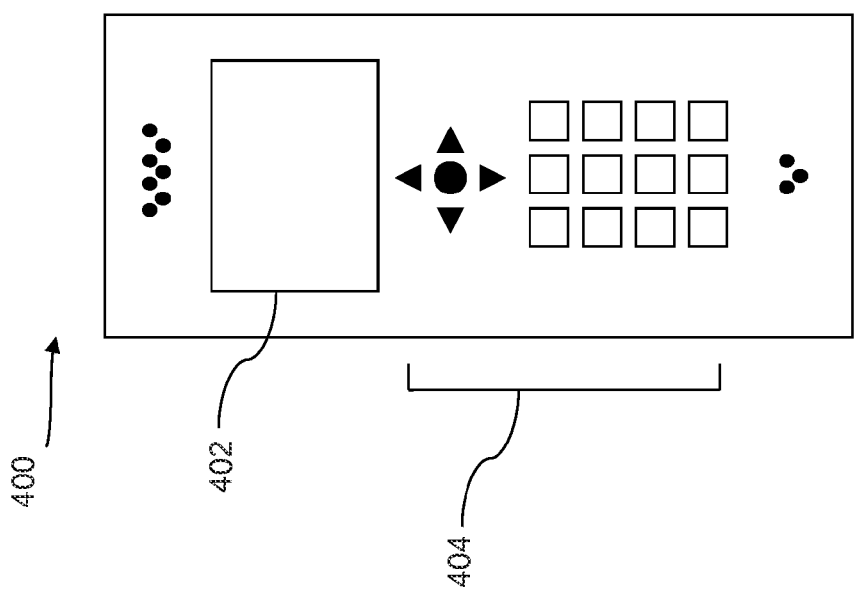
FIG. 4 depicts a mobile device operable for implementing aspects of the present disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
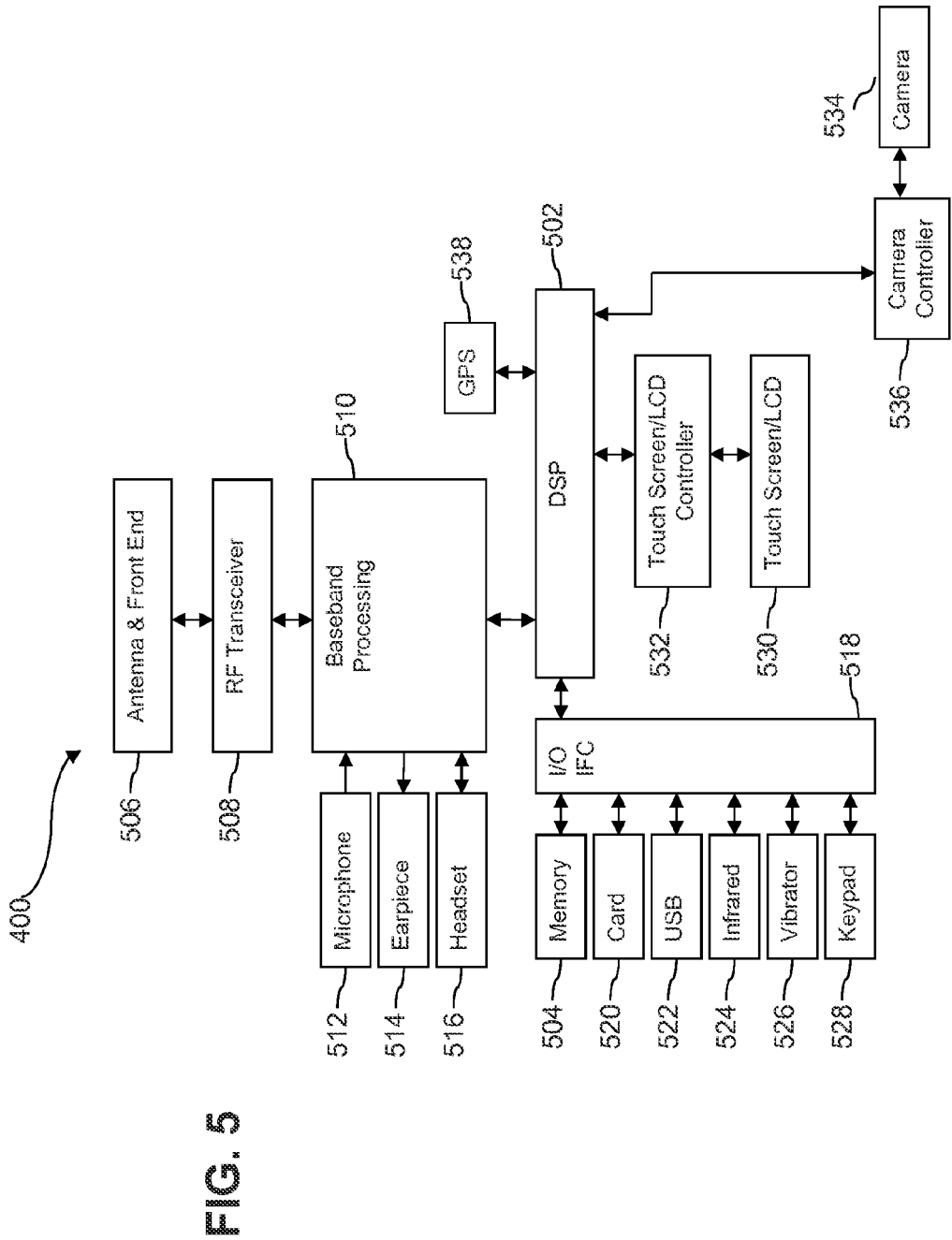
FIG. 5 depicts a block diagram of a mobile device operable for implementing aspects of the present disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
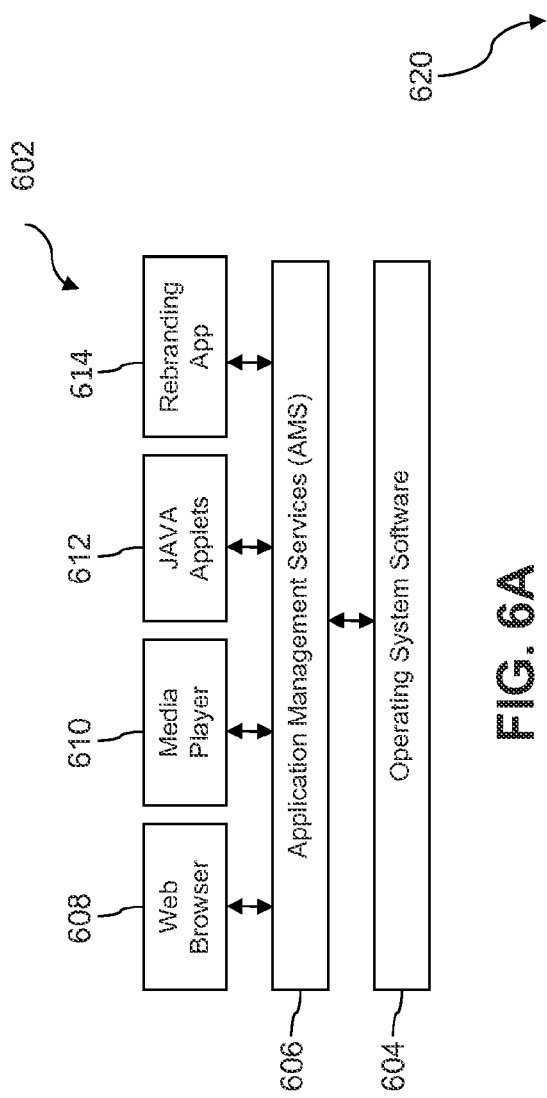
FIG. 6A illustrates a software environment capable of implementing embodiments of the present disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, a rebranding application 614, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
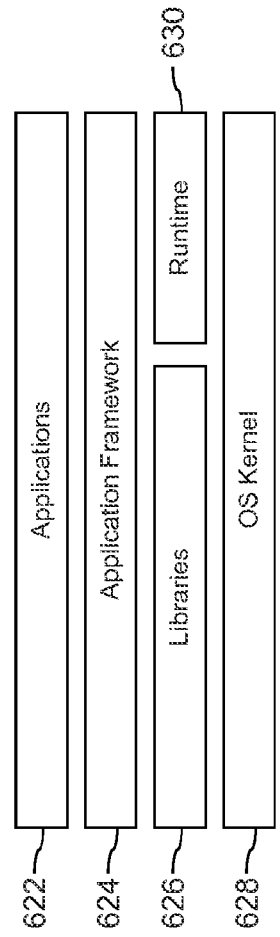
FIG. 6B illustrates an alternate software environment capable of implementing embodiments of the present disclosure.

FIG. 6B illustrates an alternative software environment 620 that may be implemented by the DSP 502. The DSP 502 executes operating system Kernel (OS Kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
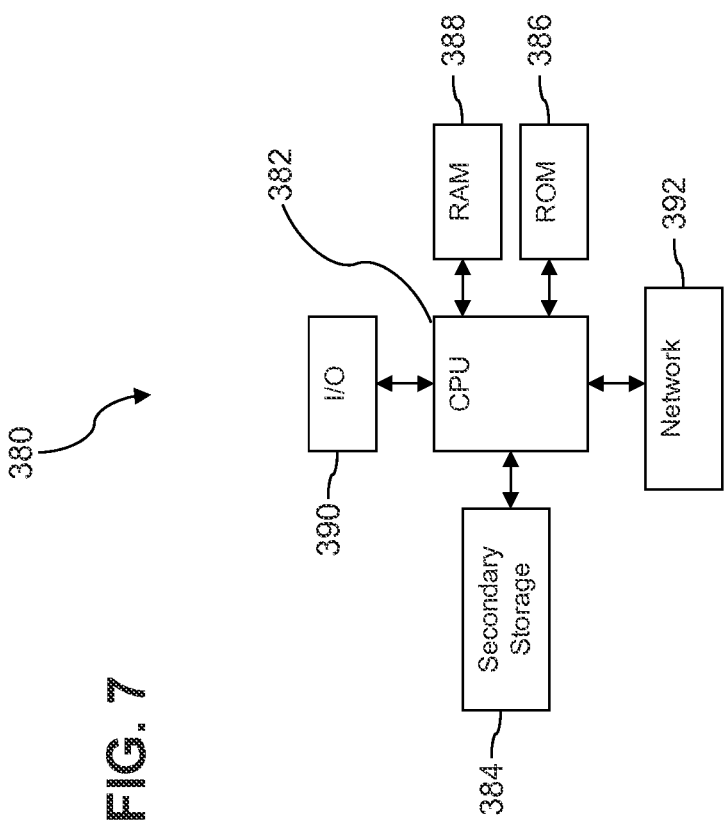
FIG. 7 illustrates a computer system suitable for implementing one or more embodiments disclosed herein.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for rebranding a portable electronic device comprising:
   a portable electronic device associated with a service brand comprising:
      a processor;
      a removable memory;
      a memory comprising:
         a system memory partition associated with a manufacturer of the portable electronic device,
         a user memory partition comprising a plurality of data, and
         a carrier memory partition associated with a telecommunications service provider; and
      an application stored in the carrier memory partition, that when executed by the processor:
         receives a file comprising a rebranding command,
         executes the rebranding command, in response to executing the rebranding command, moves at least some data of the plurality of data in the user memory partition at least one storage location other than the user memory partition, subsequent to moving the at least some data to the at least one storage location, rebrands the portable electronic device to a different service brand, wherein the rebranding resets at least the user memory partition, and in response to rebranding the portable electronic device to the different service brand, receives the at least some data from the at least one storage location and stores the at least some data back in the user memory partition.

2. The system of claim 1, further comprising a branding server comprising at least one data store for branding information, and a remote server comprising at least one data store, wherein the rebranding command is received from the branding server in response to the branding server receiving a selection of the different service brand.

3. The system of claim 2, wherein the at least one storage location comprises the system memory partition, the carrier memory partition, the removable memory, or a remote server.

4. The system of claim 2, wherein the selection of the different service brand is made in response to a notification sent to the portable electronic device from the branding server, wherein the notification sent to the portable electronic device is sent as at least one of an email, a voicemail, an MMS message, or an SMS message.

5. The system of claim 4, wherein the notification is sent based on a history of use of the portable electronic device.

6. The system of claim 1, wherein at least some data of the plurality of data are relocated to at least two storage locations.

7. The system of claim 1, wherein the removable memory is one of a SIM card or an SD card.

8. The system of claim 1, wherein the at least some data comprises one or more configuration settings for the service brand that do not directly translate to the different service brand, and wherein the application further remaps the one or more configuration settings to alternate settings or stores the one or more configuration settings without implementing the one or more configuration settings.

9. A method of rebranding a portable electronic device comprising:

receiving, by an application stored in a carrier memory partition in a non-transitory memory of a portable electronic device, a rebranding command;

executing, by the application, the rebranding command;

in response to executing the rebranding command, sending, by the application, at least some data of a plurality of data from a user memory partition in the non-transitory memory of the portable electronic device to at least one storage location other than the user memory partition;

subsequent to sending the at least some data to the at least one storage location, rebranding, by the application, the portable electronic device to a different service brand, wherein the rebranding resets factory default settings to at least the user memory partition; and in response to rebranding the portable electronic device to the different service brand, receiving, by the application, the at least some data from the at least one storage location, and sending, by the application, the at least some data back to the user memory partition.

10. The method of claim 9, wherein the rebranding command is received subsequent to the application receiving a selection of a new phone the different service brand from a notification sent to the portable electronic device.

11. The method of claim 10, wherein the notification is sent based upon a history of use of the portable electronic device.

12. A method of rebranding a portable electronic device comprising:

receiving, by an application stored in a carrier memory partition of a portable electronic device, a rebranding command, wherein the rebranding command is received in response to a selection of a new service brand from a notification sent to the portable electronic device, and wherein the notification is sent to the portable electronic device based on at least one of a history of service of the portable electronic device or a manual request;

executing, by the application, the rebranding command;

in response to executing the rebranding command, sending, by the application, at least some data of a plurality of data from a user memory partition on the portable electronic device to at least one storage location other than the user memory partition;

subsequent to sending the at least some data to the at least one storage location, rebranding, by the application, the portable electronic device to the new service brand, wherein the rebranding resets at least the user memory partition; and in response to rebranding the portable electronic device to the new service brand, receiving, by the application, the at least some data from the at least one storage location, and sending, by the application, the at least some data back to the user memory partition.

13. The method of claim 12, further comprising sending the plurality of data to the at least one storage location based upon a predetermined setting.

14. The method of claim 13, wherein the predetermined setting comprises at least a first storage location and a second storage location.

15. The method of claim 14, wherein at least a portion of the plurality of data is sent to the second storage location in response to the first storage location being unavailable.

16. The method of claim 12, wherein the history of service comprises at least one of a history of use of data services and a history of use of voice services.

17. The method of claim 16, wherein the data services comprise web browsing, application downloads, and application usage.

18. The method of claim 12, wherein the at least one storage location is one of the carrier memory partition, a remote server, the system memory partition, and a removable memory.

19. The method of claim 18, wherein the removable memory is one of an SD card or a SIM card.

20. The method of claim 12, wherein the manual request is made by one of the portable electronic device or a customer care representative.

* * * * *